Figure 1:
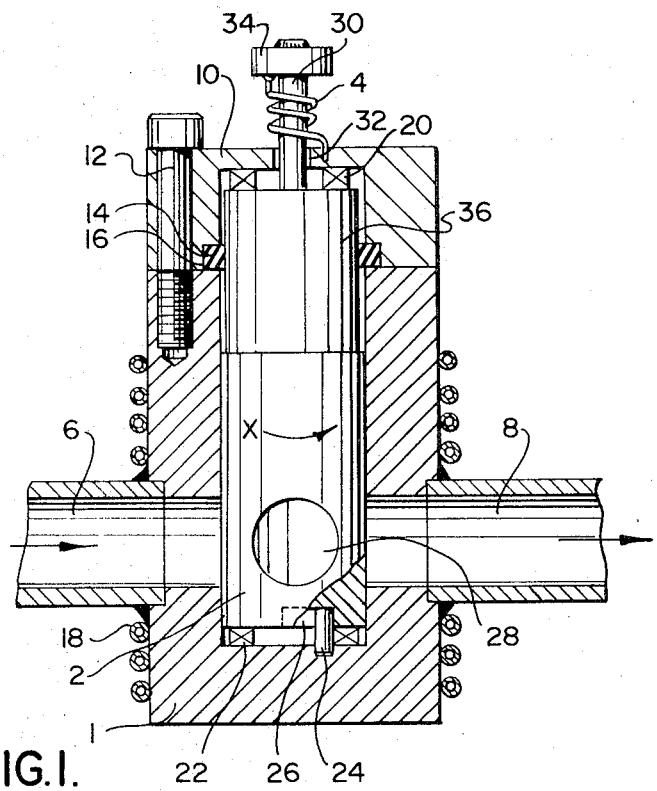

United States Patent [19]
Blackstein

[11] 3,782,681
[45] Jan. 1, 1974

[54] THERMALLY ACTUATED AND THERMALLY SEALED VALVE

[75] Inventor: Frederick Paul Blackstein, Chalk River, Ontario, Canada

[73] Assignee: Atomic Energy of Canada Limited, Ottawa, Ontario, Canada

[22] Filed: May 8, 1972

[21] Appl. No.: 250,873

[30] Foreign Application Priority Data
Aug. 11, 1971  Canada.............................. 120299

[52] U.S. Cl..................... 251/11, 251/66, 137/457, 236/90, 236/68 R
[51] Int. Cl............................................ F16k 31/02
[58] Field of Search.................... 251/66, 68, 11; 137/65, 457; 236/90, 68 R

[56] References Cited
UNITED STATES PATENTS

| 1,960,973 | 5/1934 | Knight | 137/65 |
| 1,602,886 | 10/1926 | Davis | 251/137 X |
| 3,048,190 | 8/1962 | Carling | 251/68 X |
| 2,327,336 | 8/1943 | Bolesky | 251/11 X |
| 2,572,274 | 10/1951 | Miller | 251/66 X |

Primary Examiner—Arnold Rosenthal
Attorney—Francis W. Lemon

[57] ABSTRACT

A thermally actuated and thermally sealed valve wherein a plug cock is a shrink fit within a casing, and the plug cock is urged in the operative direction by, say, a torsion spring or two electromagnets. Thermally expanding the casing and/or contracting the plug cock causes the casing to release the plug cock so that it is moved to either open or close the valve.

5 Claims, 2 Drawing Figures

THERMALLY ACTUATED AND THERMALLY SEALED VALVE

This invention relates to a thermally actuated and thermally sealed valve.

In some instances it is necessary to provide a leaktight, reliable, and tamper-proof valve, which is unlikely to be inadvertently opened or closed. It is preferable for such a valve to be of simple construction and easily maintained, by virtue or few moving parts and a fundamental sealing mechanism.

It is an object of the present invention to provide a substantially leaktight, reliable, tamper-proof, thermally actuated and thermally sealed valve, which is unlikely to be inadvertently opened or closed and which is of simple construction and easily maintained by virtue of few moving parts and a fundamental sealing mechanism.

In other instances it is necessary for a valve to be actuated to open or close the valve by, for example, a change in the temperature of the fluid whose flow is controlled by the valve.

It is another object of the present invention to provide a valve which is actuated to open or close the valve by a change in the temperature of the fluid whose flow is controlled by the valve.

According to the present invention there is provided a thermally actuated and thermally sealed valve, comprising a casing, a plug cock at a first operative position within the casing and held substantially against leakage and movement by an interference fit with the casing, and actuating means urging the plug cock from the first operative position to a second operative position, whereby differential thermal expansion or contraction between the casing and plug cock releases the plug cock for movement by the actuating means to the second operative position.

Figure 2:
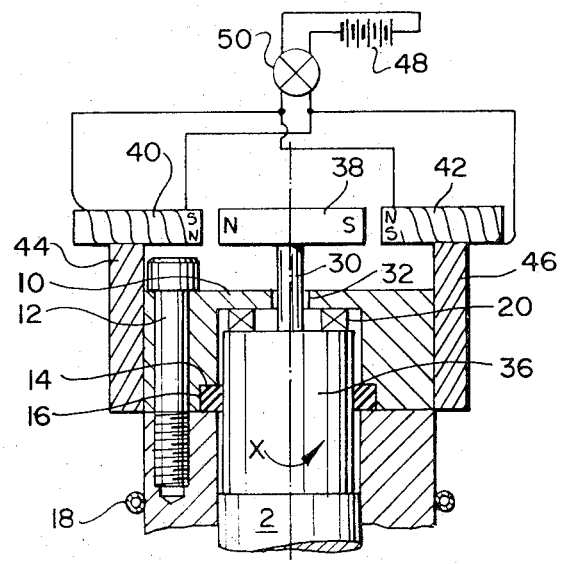

In the accompanying drawings which illustrate, by way of example, embodiments of the present invention, FIG. 1 is a partly sectioned side view of a thermally actuated and thermally sealed valve, FIG. 2 is a partly sectioned side view of a different thermally actuated valve.

Referring to FIG. 1 there is shown a thermally actuated and thermally sealed valve, comprising a casing 1, a plug cock 2 at a first operative position within the casing 1 and hold against movement and leakage by an interference fit with the casing 1. An actuating means in the form of a torsion spring 4 urges the plug cock 2 from the first operative position to a second operative position, whereby differential thermal expansion or contraction between the casing 1 and plug cock 2 releases the plug cock 2 for movement by the torsion spring 4 to the second operative position.

The casing 1 has an inlet 6 and an outlet 8, and a cap 10 closes a top portion of the casing 1. The cap 10 is secured to the casing 1 by a plurality of bolts, one of which is shown and designated 12. A seal 14 is disposed in a groove 16 and seals the plug cock 2 to the casing 1 during the operative phase. An electrical heating coil 18 is disposed around the casing 1.

The plug cock 2 is mounted in the casing 1 between bearings 20 and 22, and a pin 24 is secured in the casing 1 and is slidable in an arcuate slot 26 in the plug cock 2 to restrict rotational motion of the plug cock 2 about the longitudinal axis to 90° to position, as will be described later, a bore 28 in the plug cock 2 in alignment with the inlet 6 and outlet 8.

The upper end of the plug cock 2 has a spindle 30 extending through an opening 32 in the cap 10 and having a collar 34 welded thereon. The torsion spring 4 has one end secured to the cap 10 and the other end secured to the collar 34 and urges the plug cock 2 in the direction of arrow X.

The valve is assembled with the plug cock 2 in the first operative position as shown in FIG. 1 by heating the casing 1 and cooling the plug cock 2 so that the plug cock 2 will slide in to the casing 1. The casing 1 and plug cock 2 are then allowed to attain equilibrium temperature with the plug cock 2 in the position shown in FIG. 1. As the casing 1 and the plug cock 2 attain equilibrium temperature, the casing 1 contracts and the plug cock 2 expands so that the plug cock 2 is locked in the casing 1 against leakage and rotational movement (in the direction of arrow X) by the interference fit between the casing 1 and the plug cock 2.

The cap 10 is then rotated in the opposite direction to arrow X to wind up the coils of the torsion spring 4 and apply the desired torsion between the cap 10 and the collar 34. The cap 10 is then bolted to the casing 1. The valve is then ready for use.

In operation, when it is required to actuate the valve to move the plug cock 2 to the second operative position this is done thermally by heating the casing 1 by the electrical heating coil 18 until the casing 1 is loosened from the plug cock 2. When the casing 1 is loosened from the plug cock 2, the plug cock 2 is automatically rotated in the direction of arrow X by the torsion spring 4 until the bore 28 is aligned with the inlet 6 and the outlet 8. Further rotational movement of the plug cock 2 is prevented by the pin 24 having moved the full sweep of the arcuate slot 26. Thus the valve has been thermally actuated to be opened by the electrical heating coil 18 and thermally sealed by virtue of the interference fit at the equilibrium condition.

As an example using a steel plug cock 2 having a 1.00 inch diameter before assembled, the casing 1 may also be of steel and have an internal diameter of 0.9995 inches before assembled. By heating the casing 1 and/or cooling the plug cock 2 to create a temperature differential between them of 100°F the plug cock 2 will become a loose fit in the casing 1 for either assembly or actuation.

It will be appreciated that it is within the scope of the present invention for a valve to be thermally actuated to close the valve and similarly sealed in the closed position.

It is also within the scope of the present invention to cool the plug cock 2 to thermally actuate the valve.

The simplicity of valves according to the present invention enhances their reliability and ease of maintenance. As the valve can only by thermally actuated it may in some embodiments be actuated by changes in the temperature of the fluid whose flow is being controlled by the valve. This can be achieved by making the casing 1 and plug cock 2 of dissimilar metals such that for the same temperature change the plug cock 2 will become loosened within the casing 1, that is, the casing 1 may be expanded away from the plug cock 2, or the plug cock 2 may be contracted away from the casing 1.

In different embodiments the casing 1 may, as already stated, have a different coefficient of linear expansion than the plug cock 2, or the valve stem 1 and plug cock 2 may have different rates of thermal conductivity.

Valves of the present invention are particularly useful in areas where only intermittent use of the valve is required, more particularly when the valve is remotely located and is, for example, for shut-down purposes in emergency.

It will be noted that the plug cock 2 preferably has an upper portion 36 of smaller diameter than the lower portion to reduce thermal conductivity between the casing 1 and the plug cock 2.

In FIG. 2 parts similar to those shown in FIG. 1 are designated by the same reference numerals, and the previous description is relied upon to describe them.

The valve shown in FIG. 2 has a permanent magnet 38 mounted on the spindle 30 locked therewith. The magnet 38 has the poles disposed as indicated. Two electromagnets 40 and 42 are mounted on the cap 10 by brackets 44 and 46 respectively. The windings of the electromagnets 40 and 42 are connected to a dc power source 48 through a reversing switch 50.

The valve is assembled in the same manner as the valve shown in FIG. 1, except that during assembly the reversing switch 50 is set to energise the electromagnets so that they each attract the pole of the permanent magnet 30 that is nearest to them. This electromagnet 40 attracts the north pole and electromagnet 42 attracts the south pole. When the plug cock 2 has been locked in the casing 1 in the manner described with reference to FIG. 1, the reversing switch 50 is then set so that the electromagnets 40 and 42 repel the north and south poles respectively of the permanent magnet 38 and urge the plug cock 2 to rotate in the direction of arrow X. In order to urge the plug cock 2 to rotate in the direction of arrow X the electromagnets 40 and 42 are set slightly back from the permanent magnet 38 in the reverse direction to arrow X.

In operation the valve operates in the same manner as the valve shown in FIG. 1 except that the plug cock 2 is rotated by the electromagnets 40 and 42.

I claim:

1. A thermally actuated and thermally sealed valve, comprising a casing, a plug cock within the casing and mounted for movement therein between two operative positions at which the valve is open and closed and held substantially against said movement and leakage between the plug cock and the casing by an interference fit between the plug cock and the casing, and actuating means urging the plug cock from a first of the operative positions to a second of the operative positions, whereby differential thermal expansion or contraction between the casing and plug cock causes the plug cock to become a loose fit in the casing and releases the plug cock for movement by the actuating means to the second operative position.

2. A valve according to claim 1 wherein the means urging the plug cock from the first operative position to the second operative position comprises a torsion spring having one end secured to the casing and the other end secured to the plug cock, the plug cock is cylindrical and the torsion spring urges the plug cock to rotate within the casing to the second operative position, bearing means mount the plug cock for the rotational movement within the casing, and a seal seals the plug cock to the casing.

3. A valve according to claim 2, wherein the plug cock has a bore which is aligned with a fluid inlet and a fluid outlet in the casing in the second operative position.

4. A valve according to claim 1, comprising an electrical heating coil around the casing for heating the casing to thermally operate the valve.

5. A valve according to claim 1 wherein the actuating means urging the plug cock from the first operative position to the second operative position comprises an electromagnet, the plug cock is cylindrical and the electromagnet urges the plug cock to rotate within the casing to the second operative position, bearing means mount the plug cock for the rotational movement within the casing, and a seal seals the plug cock to the casing.

* * * * *